United States Patent Office 3,054,046
Patented Sept. 11, 1962

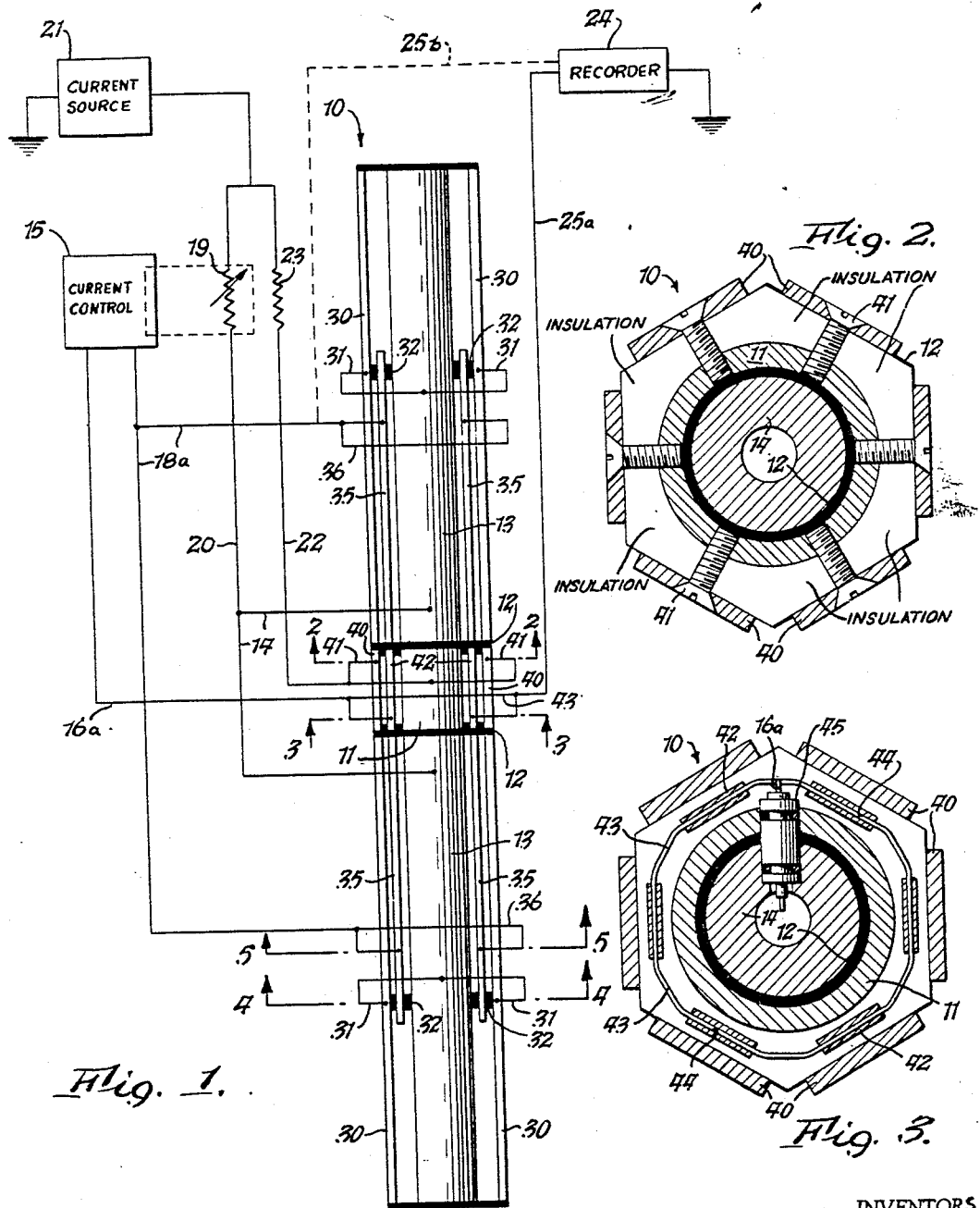

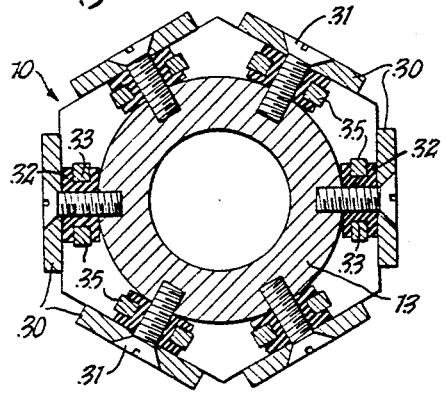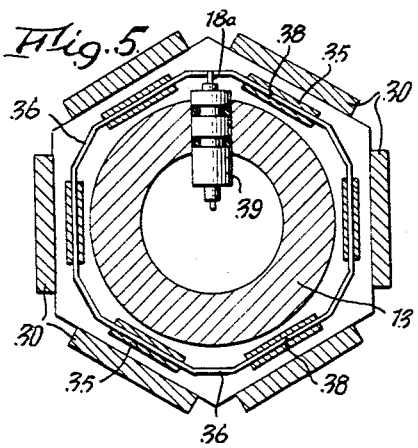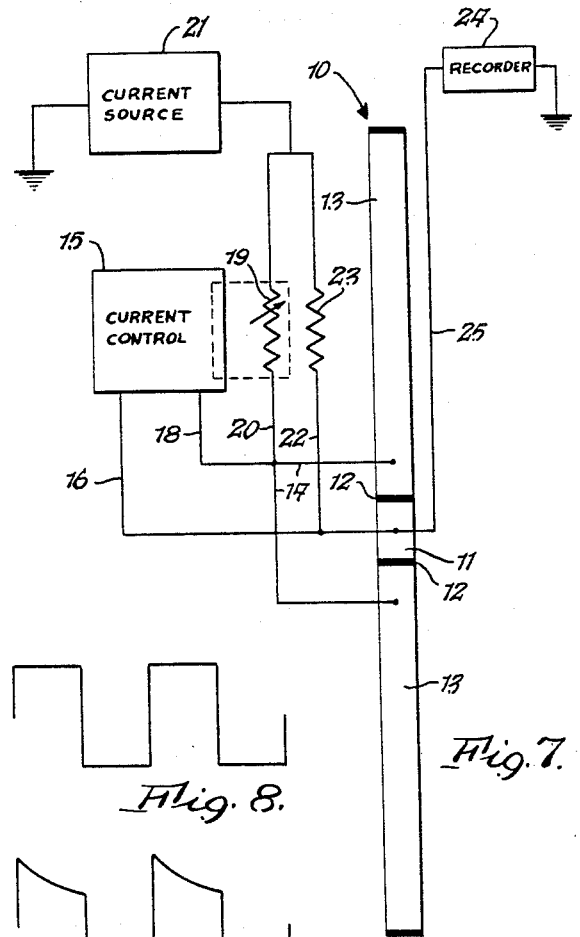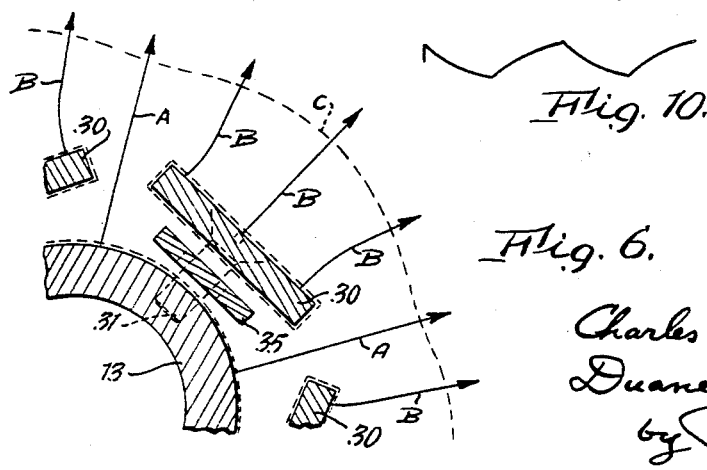

3,054,046
ELECTRODES FOR ELECTRICAL WELL LOGGING
Charles R. Holmes, Socorro, N. Mex., and Duane J. Piper, McKean, Pa., assignors to Seismograph Service Corporation, Tulsa, Okla., a corporation of Delaware
Filed Sept. 17, 1959, Ser. No. 840,719
10 Claims. (Cl. 324—1)

This invention relates to electrical well logging apparatus and more particularly to a probe used to provide highly detailed logs of the electrical resistivities of earth formations.

The probe of the present invention is of the type having a short cylindrical search electrode secured coaxially between and insulated from longer cylindrical guard or focusing electrodes.

It is an object of this invention to eliminate errors experienced in controlling the focusing action of probes of this type, which errors are introduced by the polarization voltages at the electrode surfaces.

Another object of this invention is to eliminate those difficulties experienced in controlling the focusing action of the guard electrodes of such probes that are introduced by changes in contact resistance at the electrode surfaces.

Another object of this invention is to record voltages that reflect only changes of resistivity in the formations and do not include any effects of skin or contact resistances at the electrode surfaces.

A further object of this invention is to provide well logging apparatus capable of producing resistivity logs that more accurately indicate formation boundaries and resistivities than have heretofore been possible with probes of this type.

Another object of this invention is to provide such a probe in which the shape of the distribution of the current emitted from the search electrode is maintained substantially unaltered during a run, regardless of the relative resistivities of adjacent formations or of the formations and the borehole liquid.

Another object is to provide such apparatus which is compact, sturdy, and relatively inexpensive but at the same time characterized by flexibility and stability in operation.

These and other objects of the invention are attained by employing a plurality of additional electrodes for the purpose of controlling and monitoring the electrical fields established with the main or principal search and guard or focusing electrodes above described. The advantages will be made more apparent from the folowing description and accompanying drawings in which:

FIG. 1 is a diagrammatic elevation of a probe embodying the present invention showing the arrangement of its electrodes and also showing its electrical control and recording instruments and a wiring diagram.

FIGS. 2–5 are enlarged horizontal transverse sections taken generally on the correspondingly numbered lines of FIG. 1 and showing, in greater detail, the mountings for and electrical connections between the various electrodes.

FIG. 6 is a fragmentary schematic view similar to FIGS. 4 or 5 and showing the probable distribution of current lines and orthogonal equipotential surfaces. This is also representative of the distribution of current lines from the search electrode 11.

FIG. 7 is a view similar to FIG. 1 and showing a conventional probe of the type to which this invention relates.

FIG. 8 illustrates the essentially square wave form of electric current emitted by the main search electrode 11 of the conventional probe illustrated in FIG. 7.

FIG. 9 illustrates the distorted square wave form of current emitted by the guard or focusing electrodes 13 in the conventional probe illustrated in FIG. 7.

FIG. 10 illustrates a comparison of the wave forms of FIGS. 8 and 9.

While this invention has been described in connection with a preferred embodiment, it will be understood that it is not intended to be limited to this specific embodiment, but rather to cover such equivalent and alternative constructions as may be included within the spirit and scope of the appended claims.

In oil well drilling it is important to obtain information identifying the geological strata of the surrounding formation and an important property to be determined is the electrical resistivity which varies widely in different formations principally due to variations in the quantity and quality of the fluid contained therein. For example, shales, generally, have a low resistance as compared with sandstones. In such electrical well logging of thin bedded structure in which the resistivity of the beds varies greatly, it is highly desirable that the record of the measurement of resistivity of the individual layers be influenced as little as possible by the presence of adjacent formations and of the salinity of the borehole. It is essential that the probe respond to relatively thin strata and show a sudden change in resistance as the probe passes an interface between two strata of different conductivity.

To this end, as illustrated in FIG. 7, it is the usual practice to provide a probe 10 having a short central cylindrical, preferably tubular, search electrode 11 mounted coaxially with and insulated from, as indicated at 12, longer cylindrical, preferably tubular guard or focusing electrodes 13, the latter being electrically connected as by a wire or jumper 14. Such an arrangement is shown in the Piety Patent 2,347,794 for Well Surveying Device, dated May 2, 1944. In this patent the guard or focusing electrodes 13 are maintained at substantially the same potential as the search electrode 11. This can be done by detecting, in a current control system 15 across lines 16 and 18, any potential difference that exists between the central search electrode 11 and cylindrical guard or focusing electrodes 13 and using the potential unbalance as a signal to control a feedback system 19 which automatically regulates, through a line 20, the flow of current from a current source 21 to the guard or focusing electrodes 13 to maintain a minimum difference of potential between these guard electrodes 13 and the search electrode 11. The other end of the current source is grounded, as in the slush pit at the well head, and a reference current, supplied from a line 22 containing a current limiter 23, can be maintained at a constant value through the search electrode 11. Accordingly, with such feedback system, the current flowing through the guard or focusing electrodes 13 changes in response to the change in resistance of the formation surrounding the search electrode 11. The changes in potential of the central search electrode 11 can be recorded in a high impedance recorder 24 grounded at one end in the slush pit and connected at its other end by a wire 25 with the central search electrode 11.

The longer guard or focusing electrodes 13 of the probe tend to plug the borehole electrically. The electrical current that flows outwardly into adjacent formations from these guard or focusing electrodes establishes an electrical field in which the radial component of the potential gradient in the vicinity of the probe is very large as compared with the component parallel to the probe. When this condition is met, and the axial component of the electrical field is negligible in the vicinity of the center of the probe, the current from the central search electrode 11 will be focused into a plate-like radial path for some distance from the surface of the search electrode.

The potential near the central search electrode 11 is a measure of the resistance to the flow of current through the material between the planes normal to the axis of the probe 10 and bounding the plate-like current path. If the magnitude of the current emitted by the central search electrode is kept sensibly constant, a record of the voltage measured near its surface will directly reflect the resistivity of the formations surrounding the central search electrode. In order to constrain the measuring current sheet to the desired plate-like path, the electrical potential in the vicinity of the guard electrodes 13 must be maintained substantially the same as in the vicinity of the central search electrode as previously described.

In use, the probe 10 is usually immersed in drilling fluid or natural well fluids. This borehole fluid is frequently very saline and electrically conductive. Any metal electrodes placed in a solution containing ions will polarize with the amount of polarization dependent, among other things, on the ion concentration of the solution and the current density at the electrode surface. The constant reference current emitted by the central search electrode 11 tends to maintain a fixed degree of polarization at that electrode. However, the focusing current emitted by the two guard electrodes 13 must vary greatly in response to changes in lithology. The polarization potential is in series with the voltage source and any variation with change in current will be included in the measured signal.

A low frequency alternating current of square wave shape is ordinarily used in electrical measurement with these probes. Since the magnitude of the current emitted by the central search electrode 11 is kept substantially constant, the degree of polarization of this central search electrode remains essentially unchanged. Accordingly, the square shape of the alternating current employed in the measurement, FIG. 8, essentially remains unchanged in passing through the central search electrode. However, the focusing current emitted by the two guard electrodes 13 varies greatly in magnitude in response to changes in lithology. As a result the polarization voltages at these electrodes can change substantially and the polarization of these guard electrodes changes and modifies the shape of the alternating current emitted from them, the distorted wave form of the current passing through these guard or focusing electrodes being illustrated in FIG. 9. The detector of the feedback control system 15, 19, across the lines 16 and 18, then compares the voltage associated with the square wave form of the central search electrode 11 (FIG. 8) with that of the decaying exponential wave of the guard electrodes 13 (FIG. 9). The resultant current unbalance, shown in FIG. 10, presents a saw-toothed voltage wave to the balance system at the rectifiable frequency as a synchronous electrical "noise" that alters the response of the control system to changes in lithology in the borehole. The unbalance becomes maximum in the vicinity of a thin resistive formation when logging through salty mud or fluids, as a result of the larger axial current which must be supplied to the borehole. Null systems of this type depend on a high signal to noise ratio at the detector of the current control 15 to maintain the precise potential balance necessary for accurate resistivity readings.

The true unbalance signal that actuates the current control is developed between the electrodes by the axial electrical current that flows through the borehole fluid in which the probe is immersed. If this borehole fluid is very saline and electrically conductive, it acts as a low resistivity shunt for the flow of current. As a result the potential unbalance signal developed at a formation boundary may be very small and the synchronous electrical noise developed, as in FIGS. 9 and 10, may mask the true unbalance signal sufficiently to unfocus the system seriously and result in the erroneous measurement of formation resistivity.

The null-balance method of controlling the focusing action of the conventional type of guard electrode probe as above described must operate under severe limitations. Proper focusing requires that the axial potential gradient be negligible in the vicinity of the electrodes. This gradient is, however, detected in the current control 15 as the potential unbalance that exists between the surface of the central search electrode 11 and the guard electrodes 13 and must include any spurious voltages present on the electrode surfaces that result from contact resistance.

The most deleterious type of electrical noise results from electrode polarization, particularly the varying polarization of the guard electrodes 13 due to their changing focusing current as above described. The unbalance signal detected at 15 between the search and guard electrodes 11, 13 must include the polarization voltages developed at the electrode surfaces. The polarization voltages will only be equal when the current densities are the same at the electrode surfaces. At other times, the polarization unbalance appears as the synchronous electrical "noise" above described that modifies the response of the current control 15 to changes in lithology. Opposite thin resistive formations under salty mud and logging conditions the polarization differences may be a large part of the signal unbalance, and result in a resistivity measurement that is not representative of the formation.

Other deleterious effects present in a well bore also act to distort the response to changes in lithology. The contact resistance at the surface of the electrodes depends greatly upon the salinity of the fluid in the borehole. This surface or skin resistance of the electrodes is in series with the electrical resistance of the formation under measurement. Any alteration of the contact resistance will alter the response of the control system, unfocus the probe and introduce an error into the measurement. An additional error is therefore introduced by including the contact resistance as a part of the formation resistance measurement. If the surface of the probe becomes coated with oil, the skin resistance adds greatly to the measured formation resistivity value.

The present invention as devised for overcoming these difficulties is illustrated in FIGS. 1–6 and as there shown, the main search and main guard or focusing electrodes 11, 13 are of tubular form with the main guard electrodes 13 connected by a small diameter sleeve which forms the electrical jumper 14 illustrated diagrammatically in FIG. 1. An insulation sleeve 12 supports the tubular main search electrode 11 on this sleeve or jumper 14 and insulates it from the main guard or focusing electrodes 13, this insulation being represented diagrammatically in FIG. 1.

In accordance with one of the important aspects of the present invention, an electric logging probe is provided having at least one non-polarizing control electrode spaced radially from the adjacent current emitting electrode for measuring the voltage present at the current emitting electrode with the control electrode being located in an established region of minimum current density, so that the measurement is not subjected to error resulting from polarization potentials present at the current emitting electrode. In the preferred embodiment (FIGS. 1–6), a series of elongated auxiliary guard or focusing electrodes 30 are symmetrically disposed circumferentially about each of the main guard or focusing electrodes 13 to extend lengthwise thereof. These axially extending auxiliary guard or focusing electrodes 30 are arranged in regularly circumferentially spaced relation to one another and are connected to the main guard or focusing electrodes 13 by metal screws 31 which form the electrical connectors illustrated diagrammatically in FIG. 1 as connecting each of these auxiliary guard electrodes to the main guard or focusing electrodes. These auxiliary guard electrodes 30 are maintained in the spaced relation to the main guard or search electrodes 13 by insulators 32, these insulators preferably being in the form of sleeves surrounding each of the metal screws 31 and each having a central annular channel 33 adapted to receive a focusing control electrode 35. Each focusing control electrode 35 is arranged between a companion auxiliary guard or focusing electrode 30 and the corresponding main guard or focusing electrode 13 and in spaced relation to both. Each focusing control electrode 35 is parallel to the other electrodes and the series of these focusing control electrodes 35 at each end of the probe are electrically interconnected as by an endless metal wire 36 secured in alining holes 38 through the focusing control electrodes 35. A line 18a, corresponding to the line 18 in the conventional form of the probe shown in FIG. 7, connects with each endless wire 36 and extends through a tubular insulator 39 extending through the wall of the corresponding main search electrode 13. Each line 18a connects with the current control 15 in the conventional manner as illustrated in FIGS. 7 and 1.

It is not necessary that the auxiliary guard or focusing electrodes 30 extend to the outer extremities of the main guard or focusing electrodes 13. Any extensions of the main guard or focusing electrodes can be utilized further to house auxiliary electronic control equipment, such as radioactive detectors, but since this forms no part of the present invention such extensions are not shown.

It is neither necessary nor desirable that the focusing control electrodes 35 have the same length as the auxiliary guard or focusing electrodes 30 nor, of course, the main guard or focusing electrodes 13.

An array of short auxiliary search electrodes 40 are similarly disposed circumferentially about the main search electrode 11 to extend lengthwise thereof. These axially extending auxiliary search electrodes 40 are arranged in regularly circumferentially spaced relation to one another and are connected to the main search electrode 11 by metal screws 41 which form the electrical connectors illustrated diagrammatically in FIG. 1 as connecting each auxiliary search electrode 40 to the main search electrode 11. These auxiliary search electrodes 40 are maintained in spaced relation to the main search electrode 11 by the insulators 12 as shown in FIG. 1. These insulators 12 also support the ends of search control electrodes 42 for the search electrode 11. Each search control electrode 42 is arranged between a companion auxiliary search electrode 40 and the main search electrode 11 and in spaced relation to both. Each search control electrode 42 is parallel to the other electrodes and the group of these search control electrodes are electrically interconnected by an endless metal wire 43 secured in alining holes 44 through the search electrodes 42. A line 16a corresponding to the line 16 in the conventional form of the invention shown in FIG. 7 connects with each endless wire 43 and extends through a tubular insulator 45 extending through the walls of the main search electrode 11 and metal sleeve 14 connecting the main guard or focusing electrodes 13. Each line 16a connects with the current control 15 in the conventional manner as illustrated in FIGS. 7 and 1.

The line 25a to the high impedance recorder 24, which corresponds to the line 25 in the conventional form of the invention, is shown as connected to the search control electrodes 42. Alternatively, however, as illustrated by the dotted line 25b, the high impedance recorder 24 could be connected to the focusing control electrodes 35.

FIG. 6 is a fragmentary, enlarged cross section of the array of main guard or focusing, auxiliary guard or focusing and focusing control electrodes 13, 30 and 35 showing the probable distribution of current lines and equipotential surfaces. The form and direction of the current lines from the main guard or focusing electrode 13 is illustrated by the arrow lines A. The form and direction of the current lines from the auxiliary guard or focusing electrodes 30 is illustrated by the arrow lines B. The dotted line C represents the equipotential surfaces formed by the current lines A and B. The same illustration would, of course, be suitable for the array of main, auxiliary and control search electrodes 11, 40 and 42.

From the symmetrical disposition of the control electrodes 35 between current emitting electrodes 13, 30 as illustrated in FIG. 4, it is evident that the potential at the control electrodes 35 must be that of the adjacent current electrodes 13, 30 less any voltage drop that results from the flow of current through the contact resistance of the current electrodes. From these considerations it is further evident that the electrical potential at the surfaces of the control electrodes 35 will be that of the region in which the probe is placed. If the magnitude of current from the search electrode 11 is kept sensibly constant by the limiter 23, a record of the voltage variation recorded from any one of the search control electrodes 42 through the line 25a and high impedance recorder 24, or, alternatively, from any one of the focusing control electrodes 35 through the line 25b and high impedance recorder 24, will accurately reflect the changing resistivity of the formations.

The use of control electrodes 35, 42 separate, respectively, from the current electrodes 13, 30 and 11, 40 in detecting potentials in a conductive fluid medium for the purpose of current control and for voltage measurement provides all the advantages that accrue from the use of a high impedance detector in the current control 15. When the probe is focused, the potentials of the control electrodes 35, 42 are determined by their geometric disposition with respect to the current electrodes 13, 30 and 11, 40, respectively, and the surrounding medium. With the high impedance detector, in the current control 15, very little current is drawn by the control system 15, 19 and any contact resistance present at the surfaces of the control electrodes 35, 42 is not included in the signal measured in the recorder 24.

Another advantage results from the use of the control electrodes 35, 42. The potential of the relatively short search control electrodes 42 is balanced against the average potential of the formation surrounding the guard control electrodes 35. Because of this averaging effect, the recorder 24 responds only once each time a formation boundary is crossed by the central search electrode array.

The spaced current electrodes 13, 30 are shown in FIG. 6 as providing a region of minimum current density in which the control electrodes 35 are placed. Then, since the control electrodes 35 do not carry current and are not in the radial current stream, they do not polarize, and the potentials they detect are not modified by polarization voltages at their surfaces. As a result, the response of the present logging apparatus to change in formation resistivity is materially improved and more truly reflects resistivity of the lithology under measurement. In addition if the focusing control electrodes 35 are kept short in relation to the current electrodes 13, 30 and away from the ends of the probe as shown in FIG. 1, there will be no longitudinal polarization of these electrodes 35 due to axial current flow in salty borehole fluids near the ends of the probe.

What is claimed is:

1. Well logging apparatus of the character described, comprising a pair of elongated exposed electrically conductive focusing members arranged in line with each other, a search electrode interposed between and insulated from said focusing members, a source of electric current, means supplying substantially constant current to said search electrode, a series of elongated control electrodes substantially parallel with and surrounding each focusing member and generally symmetrically spaced relative to said focusing members and relative to each other, means for detecting differences in potential between said control electrodes and said search electrode and for feeding current from said source to said focusing members in an amount providing substantial equilibrium between the potentials of said control and search electrodes, and an indicator responsive to changes in the potential of one of said electrodes.

2. Well logging apparatus of the character described, comprising a pair of elongated exposed electrically conductive focusing members arranged in line with each other, a search electrode interposed between and insulated from said focusing members, a source of electric current, means supplying substantially constant current to said search electrode, a series of elongated control electrodes substantially parallel with and surrounding each focusing member and generally symmetrically spaced relative to said focusing members and relative to each other, an elongated exposed electrically conductive auxiliary focusing member parallel to each of said control electrodes and radially outwardly spaced therefrom, means electrically connecting each focusing member to the companion auxiliary focusing members to provide a region of minimum current density in the vicinity of the control electrodes, means for detecting differences in potential between said control electrodes and search electrode and for feeding current from said source to said focusing members in an amount providing substantial equilibrium between the potentials of said control and search electrodes, and an indicator responsive to changes in the potential of one of said electrodes.

3. Well logging apparatus of the character described, comprising a pair of elongated focusing electrodes arranged in line with each other, a search electrode interposed between and insulated from said focusing electrodes, a source of electric current, means supplying substantially constant current to said search electrode, a first series of elongated control electrodes substantially parallel with and surrounding each focusing electrode and generally symmetrically spaced relative to said focusing electrodes and relative to each other, a second series of control electrodes surrounding said search electrode and generally symmetrically spaced relative to said search electrode and relative to each other, means for detecting differences in potential between said control electrodes of said first and second series and for feeding current from said source to said focusing electrode in an amount providing substantial equality in the potentials of said first and second series of control electrodes, and an indicator responsive to changes in the potential of one of said control electrodes.

4. Well logging apparatus of the character described, comprising a pair of elongated focusing electrodes arranged in line with each other, a search electrode interposed between and insulated from said focusing electrodes, a source of electric current, means supplying substantially constant current to said search electrode, a first series of elongated control electrodes substantially parallel with and surrounding each focusing electrode and generally symmetrically spaced relative to said focusing electrodes and relative to each other, an elongated auxiliary focusing electrode parallel to each control electrode of said first series and radially outwardly spaced therefrom, means electrically connecting each focusing electrode to the companion series of auxiliary focusing electrodes to provide a region of minimum current density in the vicinity of the companion control electrodes, a second series of control electrodes surrounding said search electrode and generally symmetrically spaced relative to said search electrode and relative to each other, an auxiliary search electrode parallel to each control electrode of said second series and radially outwardly spaced therefrom, means electrically connecting the search electrode to the companion series of auxiliary search electrodes to provide a region of minimum current density in the vicinity of the companion control electrodes, means for detecting differences in potential between said control electrodes of said first and second series and for feeding current from said source to said focusing electrode in an amount providing substantial equality in the potentials of said first and second series of control electrodes, and an indicator responsive to changes in the potential of one of said control electrodes.

5. In well logging equipment of the type employing a search electrode and a current source, means supplying substantially constant current to said search electrode, a focusing member coaxial with and spaced apart from said search electrode, a plurality of auxiliary focusing members each connected to said focusing member and radially spaced therefrom to define a region of minimum current density, a control electrode interposed between at least one of said auxiliary focusing members and said focusing member for measuring the potential of said region, means for detecting differences in potential between said control electrode and said search electrode and for feeding current from said source to said focusing member and said auxiliary focusing members in an amount providing substantial equilibrium between the potentials of said control and search electrodes, and an indicator responsive to changes in potential of one of said electrodes.

6. In well logging equipment of the type employing a search electrode and a current source, means supplying substantially constant current to said search electrode, a focusing member coaxial with and spaced apart from said search electrode, a plurality of elongated auxiliary focusing members each connected to said focusing member and radially spaced therefrom to define a region of minimum current density, a first control electrode interposed between at least one of said auxiliary focusing members and said focusing member for measuring the potential of said region, a plurality of auxiliary search electrodes each connected to said search electrode and radially spaced therefrom to define a second region of minimum current density, a second control electrode interposed between at least one of said auxiliary search electrodes and said search electrode for measuring the potential of said second region, means for detecting differences in potential between said first control electrode and said second control electrode and for feeding current from said source to said focusing member and said auxiliary focusing members in an amount providing substantial equilibrium between the potentials of said first and second control electrodes, and an indicator responsive to changes in potential of one of said control electrodes.

7. Well logging apparatus of the character described, comprising a pair of elongated exposed electrically conductive focusing members arranged in line with each other, a search electrode interposed between and insulated from said focusing members, a source of electric current, means supplying substantially constant current to said search electrode, a plurality of elongated auxiliary focusing members connected to said focusing members and radially spaced therefrom to define a region of minimum current density adjacent each focusing member, a control electrode interposed between at least one of said auxiliary focusing members and its respective focusing member for measuring the potential of each of said regions, means for detecting differences in potential between said control electrodes and said search electrode and for feeding current from said source to said focusing members in an amount providing substantial equilibrium between the potentials of said control and search electrodes, and an indicator responsive to changes in the potential of one of said electrodes.

8. In well logging equipment of the type employing a search electrode and a current source, means supplying substantially constant current to said search electrode, a focusing member coaxial with and spaced apart from said search electrode, an auxiliary focusing member connected to said focusing member and radially spaced therefrom to define a region of minimum current density, a control electrode interposed between said auxiliary focusing member and said focusing member for measuring the potential of said region, means for detecting differences in potential between said control electrode and said search electrode and for feeding current from said source to said focusing member and said auxiliary focusing member in an amount providing substantial equilibrium between the potentials of said control and search electrodes, and an indicator responsive to changes in potential of one of said electrodes.

9. In well logging equipment of the type employing a search electrode and a current source, means supplying substantially constant current to said search electrode, a focusing member coaxial with and spaced apart from said search electrode, an auxiliary focusing member connected to said focusing member and radially spaced therefrom to define a region of minimum current density, a first control electrode interposed between said auxiliary focusing member and said focusing member for measuring the potential of said region, an auxiliary search electrode connected to said search electrode and radially spaced therefrom to define a second region of minimum current density, a second control electrode interposed between said search electrode and said auxiliary search electrode for measuring the potential of said second region, means for detecting differences in potential between said first and second control electrodes and for feeding said current from said source to said focusing member and auxiliary focusing member in an amount providing substantial equilibrium between the potentials of said first and second control electrodes, and an indicator responsive to changes in potential of one of said control electrodes.

10. Well logging apparatus of the character described, comprising a pair of elongated focusing electrodes arranged in line with each other, a search electrode interposed between and insulated from said focusing electrodes, a source of electric current, means supplying substantially constant current to said search electrode, a first elongated control electrode parallel with and radially spaced apart from each of said focusing electrodes, an elongated auxiliary focusing electrode parallel with and radially outwardly spaced with respect to each of said first control electrodes, means electrically connecting each focusing electrode to its respective auxiliary focusing electrode to provide a region of minimum current density in the vicinity of its respective control electrode, a second control electrode parallel with and radially spaced apart from said search electrode, an auxiliary search electrode parallel with and radially outwardly spaced with respect to said second control electrode, means electrically connecting said search electrode to said auxiliary search electrode to provide a region of minimum current density in the vicinity of said second control electrode, means for detecting differences in potential between said first and second control electrodes and for feeding current from said source to said focusing electrode in an amount providing substantial equilibrium in the potentials of said first and second control electrodes, and an indicator responsive to changes in the potential of one of said control electrodes.

References Cited in the file of this patent
UNITED STATES PATENTS

| | | |
|---|---|---|
| 2,712,627 | Doll | July 5, 1955 |
| 2,712,630 | Doll | July 5, 1955 |
| 2,803,796 | Schuster | Aug. 20, 1957 |